US012336669B2

(12) United States Patent
Martin et al.

(10) Patent No.: US 12,336,669 B2
(45) Date of Patent: Jun. 24, 2025

(54) HAND-HELD HOUSING FOR MULTI-PURPOSE FOOD PREPARATION APPLIANCE

(71) Applicant: SEB S.A., Ecully (FR)

(72) Inventors: Philippe Martin, Andouille (FR); Frédéric Gruau, Laval (FR); Stéphane Grassin, Moulay (FR)

(73) Assignee: SEB S.A. (FR)

( * ) Notice: Subject to any disclaimer, the term of this patent is extended or adjusted under 35 U.S.C. 154(b) by 0 days.

(21) Appl. No.: 18/039,629

(22) PCT Filed: Nov. 29, 2021

(86) PCT No.: PCT/EP2021/083374
§ 371 (c)(1),
(2) Date: May 31, 2023

(87) PCT Pub. No.: WO2022/117505
PCT Pub. Date: Jun. 9, 2022

(65) Prior Publication Data
US 2024/0000269 A1  Jan. 4, 2024

(30) Foreign Application Priority Data
Dec. 1, 2020 (FR) .................................. 2012501

(51) Int. Cl.
A47J 43/08 (2006.01)
A47J 43/044 (2006.01)
A47J 43/10 (2006.01)

(52) U.S. Cl.
CPC ........... *A47J 43/087* (2013.01); *A47J 43/044* (2013.01); *A47J 43/10* (2013.01); *A47J 2043/04418* (2013.01); *A47J 2043/04427* (2013.01)

(58) Field of Classification Search
CPC ............................................ A47J 2043/04427
(Continued)

(56) References Cited

U.S. PATENT DOCUMENTS 2,287,260 A * 6/1942 Luck .................. A61B 17/1624
D24/146
2,963,913 A * 12/1960 Wensloff ............... B23B 45/005
74/421 A
(Continued)

FOREIGN PATENT DOCUMENTS

EP 1733665 A2 12/2006
EP 2623000 A1 8/2013
(Continued)

OTHER PUBLICATIONS

International Search Report for Application No. PCT/EP2021/083374 mailed Feb. 24, 2022, pp. 1-3.

*Primary Examiner* — David L Sorkin
(74) *Attorney, Agent, or Firm* — Lerner David LLP

(57) ABSTRACT

A hand-held housing for a multi-purpose food preparation appliance, has at least one first drive output configured to drive a removable rotary work tool, an opening configured for mounting a removable work accessory, retaining members configured to engage with a connecting element of the work accessory mounted in the opening, and a second drive output configured to drive a rotary drive unit of the work accessory mounted in the opening.
The retaining members are arranged on an outer part of a protrusion arranged inside the housing around the second drive output, the retaining members being configured to engage with an inner part of the connecting element.

17 Claims, 8 Drawing Sheets

(58) Field of Classification Search
USPC ............................................ 366/129; 310/50
See application file for complete search history.

(56) References Cited

U.S. PATENT DOCUMENTS

| | | | | |
|---|---|---|---|---|
| 3,595,093 | A * | 7/1971 | Du Bois | ............ B23D 57/0076 366/349 |
| 5,261,135 | A * | 11/1993 | Mitchell | ................. B25B 21/00 408/20 |
| 5,276,929 | A * | 1/1994 | Mitchell | ............... B25B 21/002 408/239 R |
| 5,803,598 | A * | 9/1998 | Harry | .................. A47J 43/0755 366/129 |
| 5,871,278 | A | 2/1999 | Harry et al. | |
| 6,726,353 | B1 | 4/2004 | Beaudet et al. | |
| 2018/0178367 | A1 * | 6/2018 | Benson | ................. A47J 43/044 |

FOREIGN PATENT DOCUMENTS

| | | | |
|---|---|---|---|
| FR | 2794960 | A1 | 12/2000 |
| WO | 9625081 | A1 | 8/1996 |

* cited by examiner

[Fig 1]
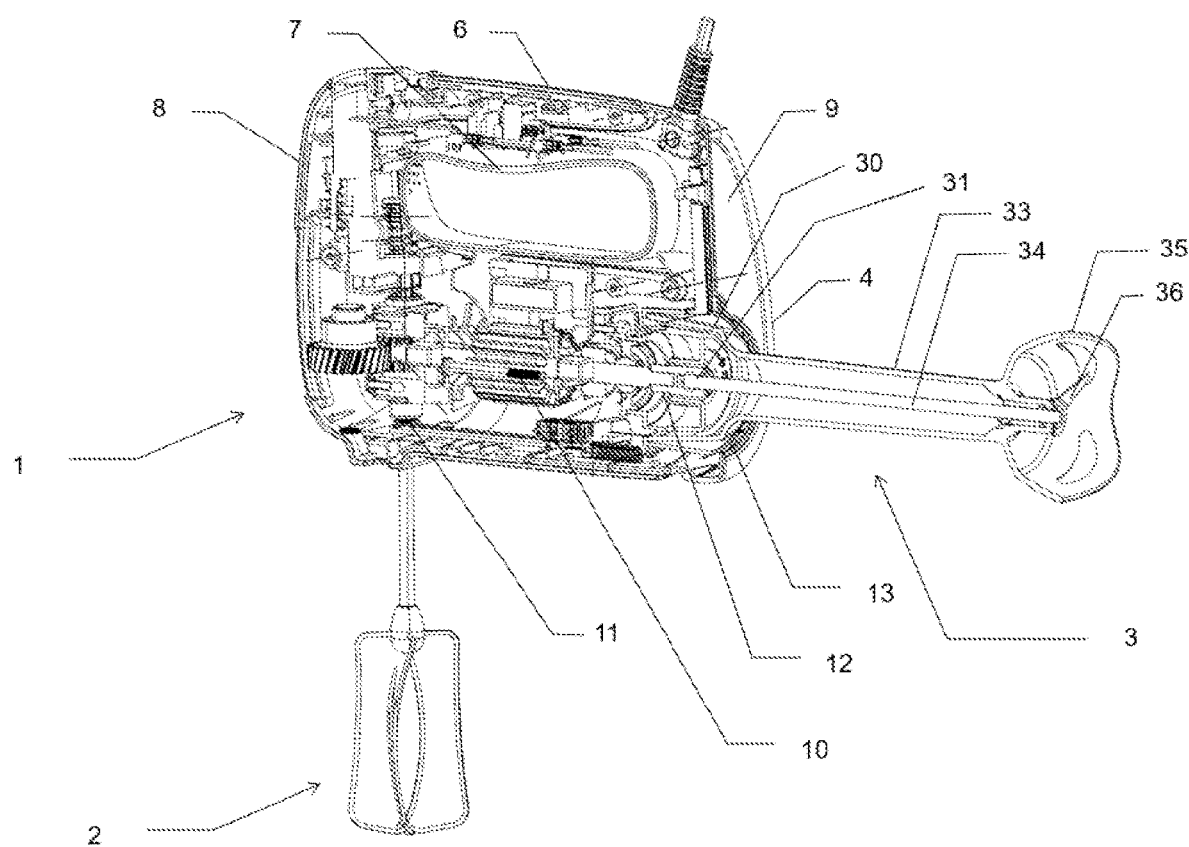

[Fig 2]
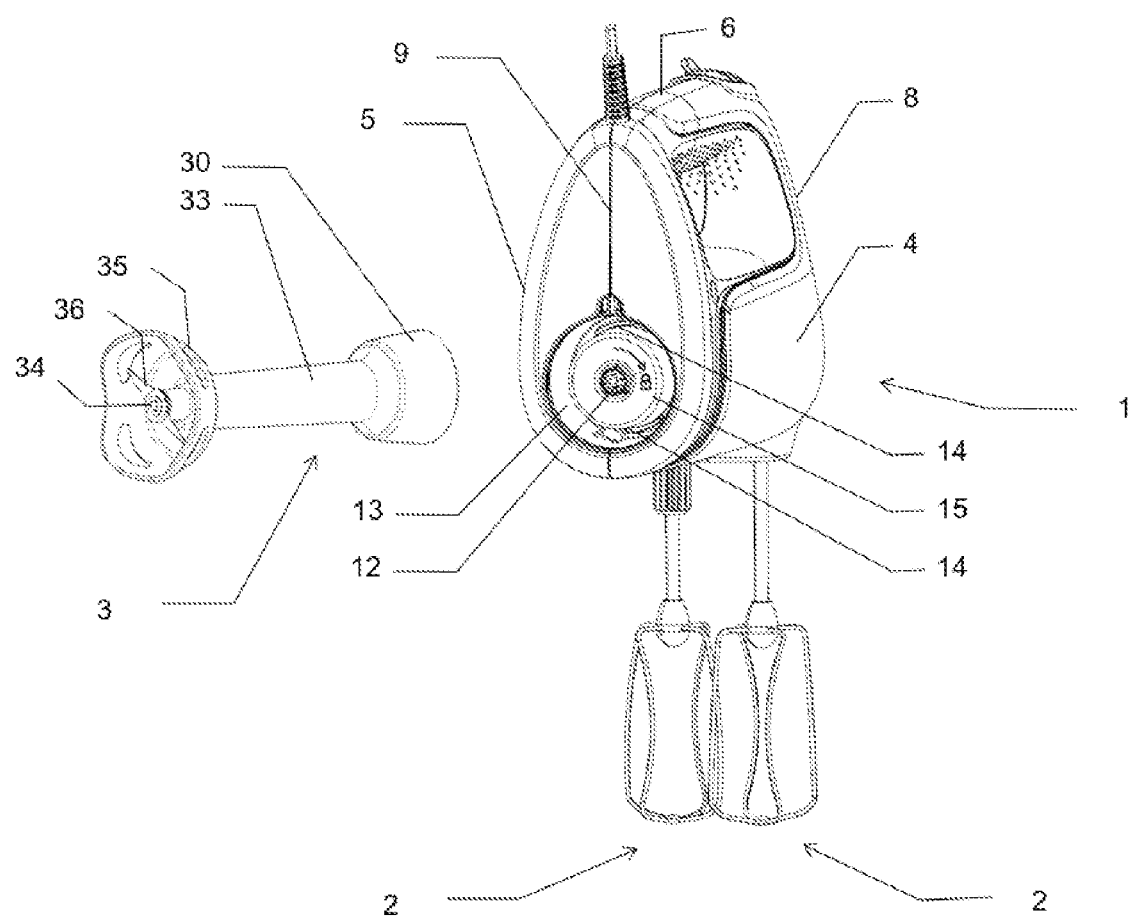

[Fig 3]
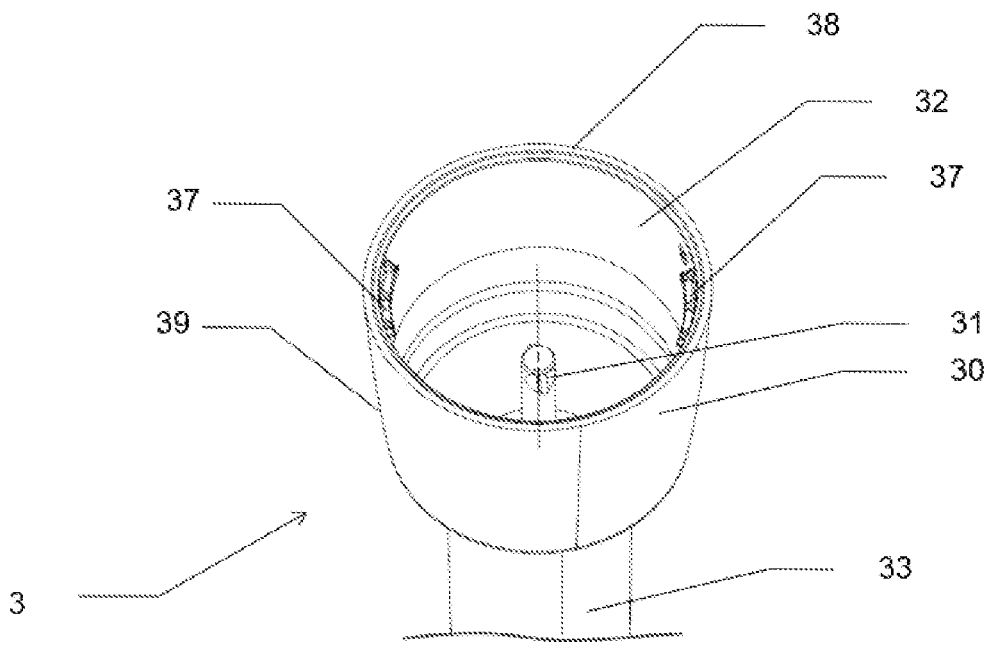
[Fig 4]
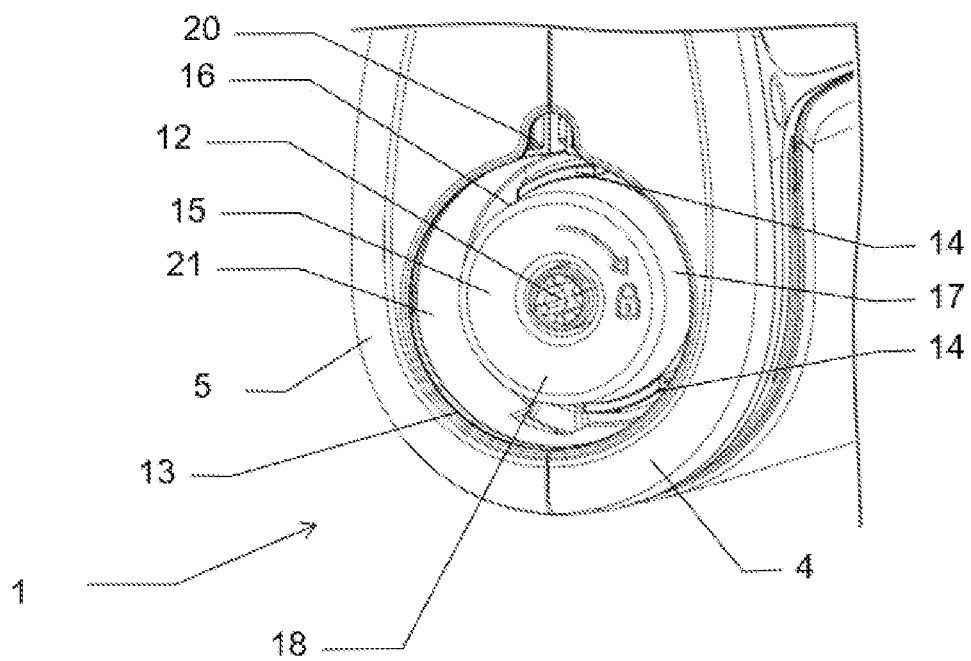

[Fig 5]
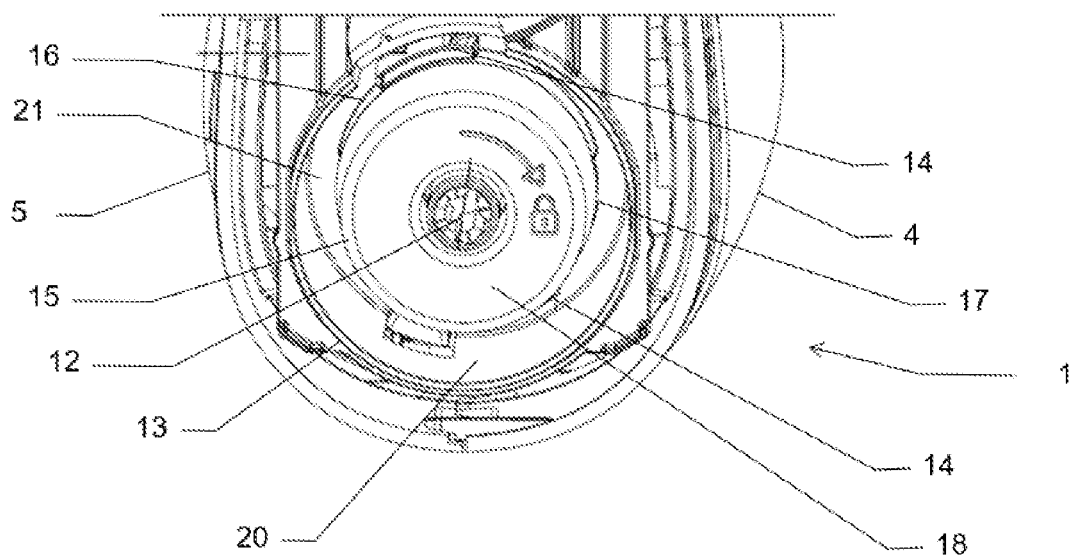
[Fig 6]
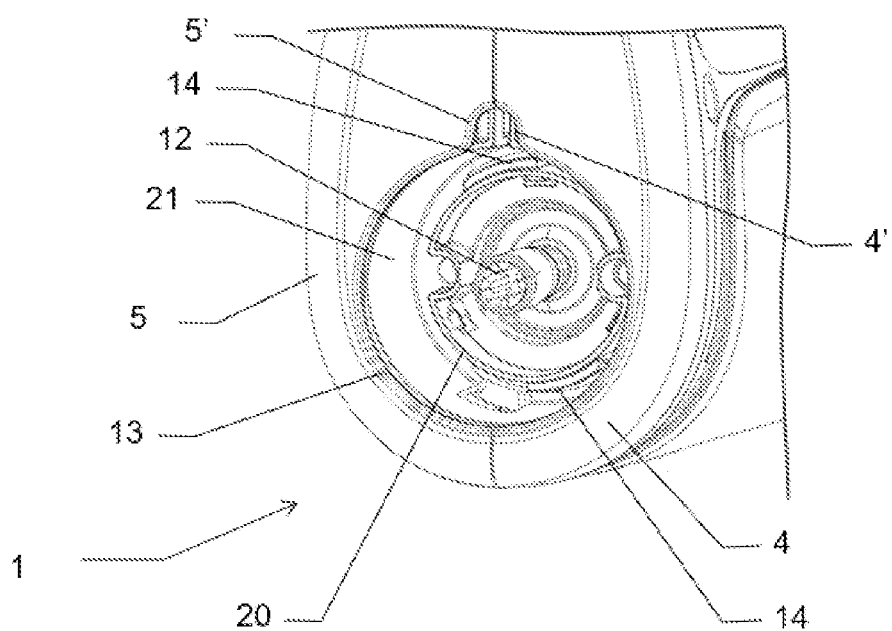

[Fig 7]
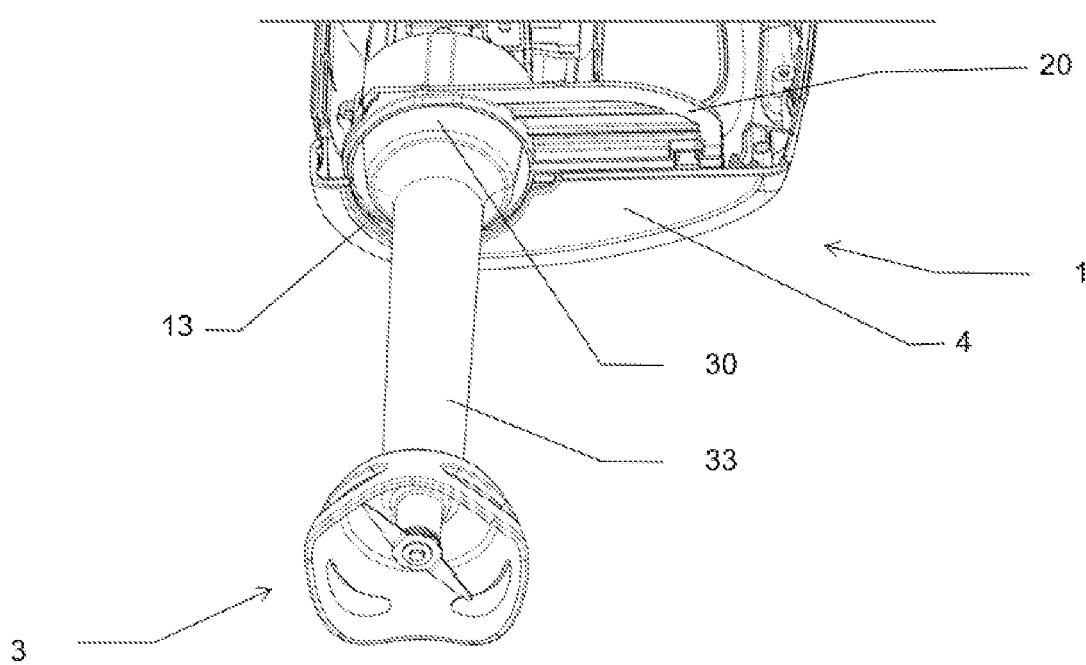

[Fig 8]
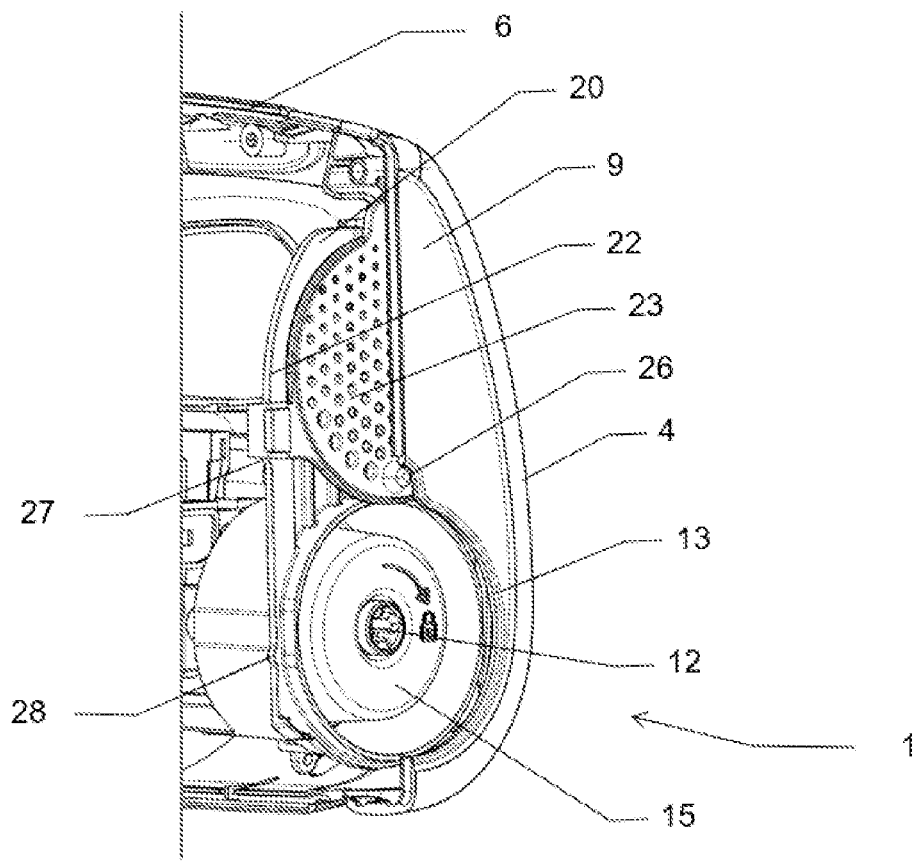

[Fig 9]
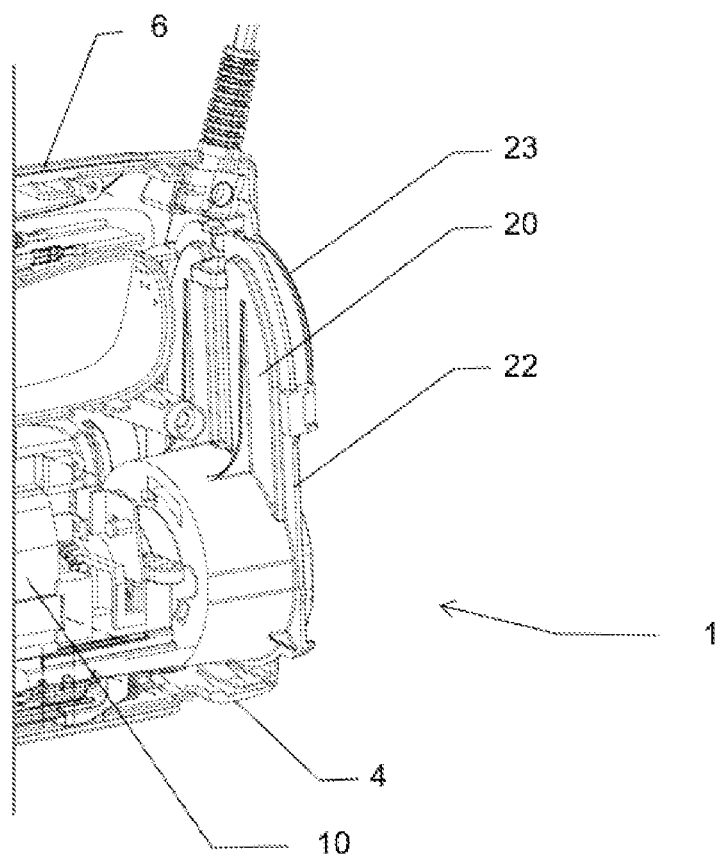

[Fig 10]
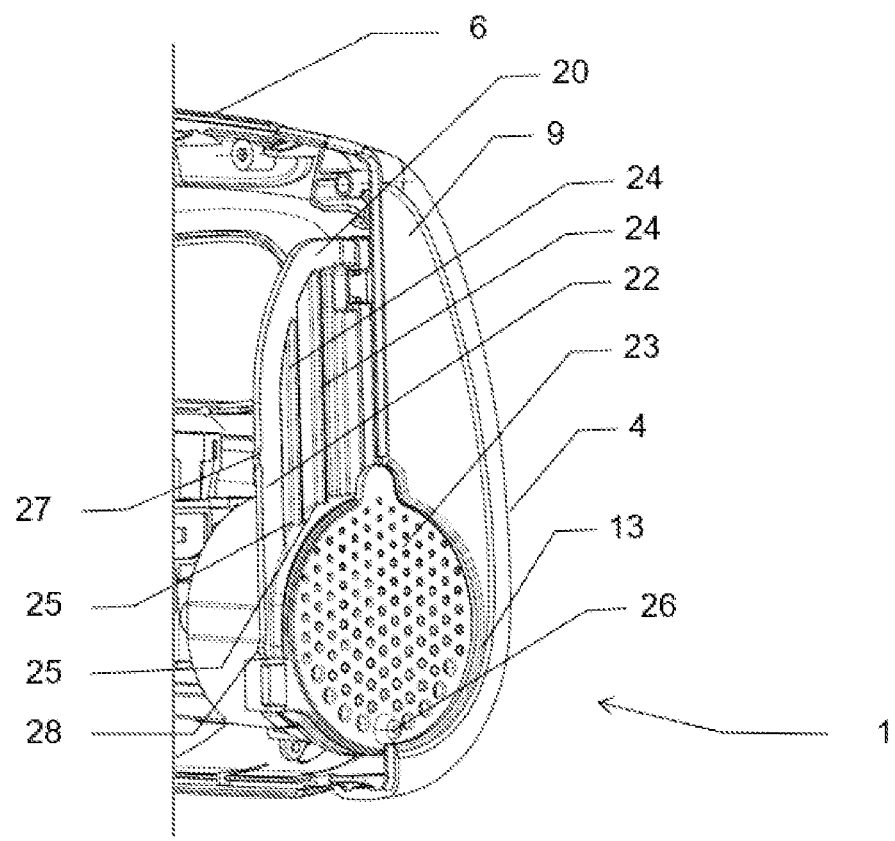

HAND-HELD HOUSING FOR MULTI-PURPOSE FOOD PREPARATION APPLIANCE

CROSS-REFERENCE TO RELATED APPLICATIONS

The present application is a national phase entry under 35 U.S.C. § 371 of International Application No. PCT/EP2021/083374 filed Nov. 29, 2021, which claims priority from French Application No. 2012501 filed on Dec. 1, 2020, all of which are incorporated herein by reference.

TECHNICAL FIELD

The present invention relates to the technical field of multi-purpose food preparation appliances.

The present invention relates more particularly to multi-purpose food preparation appliances comprising a hand-held motorized housing and comprising several types of drive outputs configured for use with either removable rotary work tools or removable work accessories.

STATE OF THE ART

Document WO96/25/081 discloses an appliance of the aforementioned type in which the motorized housing has a rear opening provided for mounting a mixing accessory. This document proposes to mount the mixing accessory in a cylindrical barrel supported by the electric motor. The end of the mixing accessory that engages in the housing thus has a relatively small cross-section. One drawback of the aforementioned embodiment is that the axis of the mixing accessory must be correctly aligned with the axis of the drive output so that the mixing accessory can be mounted. Mounting the mixing accessory can be challenging.

SUMMARY OF THE INVENTION

The present invention aims to remedy this disadvantage. The technical problem behind the invention is to facilitate the mounting of a removable work accessory comprising a connecting element and a rotary drive unit, such as a mixing accessory, on a hand-held motorized housing of a multi-purpose food preparation appliance.

One purpose of the invention is to provide a hand-held housing for a multi-purpose food preparation appliance, in which the mounting of a removable work accessory comprising a connecting element and a rotary drive unit is facilitated.

A further purpose of the invention is to provide a hand-held housing for a multi-purpose food preparation appliance, in which the mounting of a removable work accessory comprising a connecting element and a rotary drive unit is facilitated and the construction of which is simple to achieve.

Another purpose of the invention is to provide a multi-purpose food preparation appliance comprising a hand-held housing and a removable work accessory comprising a connecting element and a rotary drive unit, in which the mounting of the removable work accessory in the housing is facilitated.

A further purpose of the invention is to provide a multi-purpose food preparation appliance comprising a hand-held housing and a removable work accessory comprising a connecting element and a rotary drive unit, in which the mounting of the removable work accessory in the housing is facilitated and the construction of which is simple to achieve.

These purposes are achieved with a hand-held housing for a multi-purpose food preparation appliance, housing an electric motor, the housing having at least one and preferably two first drive output(s) driven by the electric motor and (each) configured to drive a removable rotary work tool, the housing having an opening configured for mounting a removable work accessory, the housing having retaining members configured to engage with a connecting element of the work accessory mounted in the opening, the housing having a second drive output driven by the electric motor and configured to drive a rotary drive unit of the work accessory mounted in the opening, due to the fact that the retaining members are arranged on an outer part of a protrusion arranged inside the housing around the second drive output and that the retaining members are configured to engage with an inner part of the connecting element. These provisions enable the retaining members to be housed in the housing while facilitating the placement of the connecting element in the housing. The connecting element may be engaged in the opening around the protrusion and then guided by the protrusion as engagement continues.

The protrusion may have a frustoconical end. This provision makes it easier to guide the connecting element.

The retaining members may be supported by a structural piece arranged in the housing behind the opening. This provision makes the housing easier to make and simplifies its construction.

The second drive output may run through the structural piece. This provision improves the mechanical strength of the structural piece, compared to a structural piece with a notch for the passage of the second drive output, or allows for smaller dimensions creating a space for the passage of the second drive output, which helps simplify the construction of the housing.

The frustoconical end may be formed by an annular cover mounted on the structural piece. This provision makes the housing easier to make and simplifies its construction.

The structural piece may form a cavity opening into the opening, with the retaining members being arranged in the cavity. This provision makes the housing easier to make and simplifies its construction.

The structural piece may form a slider on which slides a panel capable of occupying an open position in which the opening is uncovered and a closed position in which the opening is covered by the panel. This provision makes it possible to conceal the second drive output, while keeping construction simple.

The slider may have guide ridges and the panel may have guide notches sliding on the guide ridges when the panel is moved between the open and closed positions, or inversely. This provision makes the panel easier to move, while keeping construction simple.

The structural piece may extend into a rear strut of the housing. This provision makes the slidably mounted panel easier to make.

The housing may have a handle extending from the rear strut. This provision makes the housing easier to use.

The housing may comprise two outer half-shells, with the structural piece held between the two assembled outer half-shells. This provision makes the housing easier to make.

These purposes are also achieved with a multi-purpose food preparation appliance comprising a hand-held housing and a removable work accessory configured to be mounted in the housing, the work accessory comprising a rotary drive unit and a connecting element, in that the housing conforms to at least one of the aforementioned features. These provisions make the multi-purpose food preparation appliance easier to make.

The inner part may have internal fastening members that engage with the retaining members when the work accessory is mounted in the opening. This provision makes the work accessory easier to make.

The inner part may be part of an annular wall of the connecting element. This provision makes the work accessory easier to make and improves its robustness.

The annular wall may cover the protrusion when the work accessory is mounted in the opening. This provision makes it easier to place the work accessory in the housing.

BRIEF DESCRIPTION OF THE FIGURES

The purposes, aspects and advantages of this invention, according to the description given below of a particular embodiment of the invention presented by way of non-limiting example, and of variants, will be better understood by referring to the attached drawings in which:

FIG. 1 is a longitudinal cross-sectional view of an exemplary embodiment of a multi-purpose food preparation appliance comprising a hand-held housing according to the invention, two removable rotary work tools and a removable work accessory;

FIG. 2 is a rear perspective view of the appliance illustrated in FIG. 1, in which the work accessory is disconnected from the housing;

FIG. 3 is a partial perspective view of the work accessory illustrated in FIGS. 1 and 2;

FIG. 4 is a partial rear perspective view of the housing illustrated in FIGS. 1 and 2;

FIG. 5 is a partial rear perspective and cross-sectional view of the housing illustrated in FIGS. 1, 2 and 4;

FIG. 6 is a partial rear perspective view of the housing illustrated in FIGS. 1, 2, 4 and 5, in which a cover has been removed;

FIG. 7 is a perspective view showing the removable work accessory illustrated in FIGS. 1 through 3 mounted on the housing illustrated in FIGS. 1, 2 and 4 through 6, in which one half-shell of the housing is not shown, FIG. 8 is a perspective view of a variant embodiment of the housing illustrated in FIGS. 1, 2 and 4 through 7, in which one half-shell of the housing is not shown, and in which the housing comprises a sliding inner cover panel shown in the open position, FIG. 9 is a perspective view of the variant embodiment of the housing illustrated in FIG. 8, from another angle, in which one half-shell of the housing is not shown, and in which the sliding inner cover panel is shown in the open position, FIG. 10 is a perspective view of the variant embodiment of the housing in FIGS. 8 and 9, from the angle in FIG. 8, in which one half-shell of the housing is not shown, and in which the sliding inner cover panel is shown in the closed position.

FIGS. 1 and 2 illustrate an exemplary embodiment of a multi-purpose food preparation appliance comprising a hand-held housing 1, removable rotary work tools 2, and a removable work accessory 3.

The rotary work tools 2 shown in FIGS. 1 and 2 are whisks for emulsifying or beating egg whites.

The work accessory 3 shown in FIGS. 1 and 2 is a mixing stand. The work accessory 3 comprises an elongated barrel 33 housing a shaft 34. One end of the elongated barrel 33 forms a connecting element 30 configured to be mounted in the housing 1. The connecting element 30 surrounds a rotary drive unit 31 arranged at one end of the shaft 34. The other end of the elongated barrel 33 forms an open dome 35 surrounding a knife 36 mounted at the other end of the shaft 34.

As can be seen in FIG. 1, the housing 1 houses an electric motor 10. In the exemplary embodiment illustrated in the figures, the housing 1 comprises two outer half-shells 4; 5 that are screwed and/or snapped together.

The housing 1 has a handle 6 configured to use the housing 1 with the rotary work tools 2 or with the work accessory 3. In the exemplary embodiment illustrated in the figures, the handle 6 is a closed handle. The handle 6 has an elongated gripping area 7. The handle 6 extends between a front strut 8 and a rear strut 9 of the housing 1. The handle 6 is connected to the main part of the housing 1 housing the electric motor 10 via the front strut 8 and the rear strut 9. As a variant, the handle 6 could in particular be an open handle connected by a single strut to the main part of the housing 1 housing the electric motor 10.

The housing 1 has two first drive outputs 11, only one of which can be seen in FIG. 1. The first two drive outputs 11 are driven by the electric motor 10 and are configured to drive one of the rotary work tools 2. An angular gearbox is arranged between the electric motor 10 and the first two drive outputs 11. Preferably, the angular gearbox also acts as a speed-reduction mechanism.

As can be seen more clearly in FIG. 2, the housing 1 has an opening 13 configured for mounting the work accessory 3. The opening 13 is arranged on a rear side of the housing 1. The opening 13 is arranged facing the electric motor 10. The housing 1 has a second drive output 12 driven by the electric motor 10. Preferably, the second drive output 12 is arranged in the axis of the electric motor 10 and is driven in direct drive by the electric motor 10.

FIG. 3 shows an inner part 32 of the connecting element 30. The connecting element 30 is configured to be mounted in the opening 13 of the housing 1, as shown in FIG. 1. The inner part of the connecting element 30 has internal fastening members 37. The rotary drive unit 31 is configured to be driven by the second drive output 12 when the connecting element 30 is mounted in the opening 13 of the housing 1. The internal fastening members 37 are configured to engage in the housing 1 when the work accessory 3 is mounted in the opening 13.

In the exemplary embodiment illustrated in the figures, the connecting element 30 has an annular edge 38 and an annular wall 39. The inner part 32 of the work accessory 3 that engages with the retaining members 14 is part of the annular wall 39. The internal fastening members 37 are arranged inside the annular wall 39. In the exemplary embodiment illustrated in the figures, two internal fastening members 37 are arranged facing each other inside the annular wall 39.

The second drive output 12 is configured to drive the rotary drive unit 31 of the work accessory 3 mounted in the opening 13.

The housing 1 has retaining members 14, which can be seen more clearly in FIGS. 4 to 7. The retaining members 14 are arranged in the housing 1 and can be accessed through the opening 13. The retaining members are configured to engage with the connecting member 30 of the work accessory 3 mounted in the opening 13. More particularly, the retaining members 14 are configured to rotationally engage with the connecting member 30. The retaining members 14 are configured to rotationally engage with the internal fastening members 37 when the connecting member 30 is mounted in the opening 13.

As can be seen more clearly in FIGS. 4 and 5, the retaining members 14 are arranged on an outer part 16 of a protrusion 15 arranged inside the housing 1 around the second drive output 12. The protrusion 15 has a frustoconical end 17. In the exemplary embodiment illustrated in the figures, two retaining members 14 are arranged facing each other inside the housing 1 around the second drive output 12.

The housing 1 houses a structural piece 20, which can be seen more clearly in FIGS. 5, 6 and 7. The structural piece 20 is arranged in the housing 1 behind the opening 13. The structural piece 20 forms a cavity 21 opening into the opening 13, which can be seen in FIGS. 2 to 4. As can be seen in FIGS. 2 through 5, the retaining members 14 are supported by the structural piece 20. The retaining members 14 are arranged in the cavity 21. In the exemplary embodiment illustrated in the figures, the structural piece 20 is attached to the electric motor 10.

In the exemplary embodiment illustrated in the figures, the frustoconical end 17 is formed by an annular cover 18. As can be seen in FIG. 5, the annular cover 18 is mounted on the structural piece 20. In FIG. 6, the annular cover 18 has been removed. As can be seen in FIG. 6, the second drive output 12 runs through the structural piece 20. In the exemplary embodiment illustrated in FIG. 6, the structural piece 20 surrounds the second drive output 12. As a variant, the structural piece 20 could in particular have a notch or an indentation that creates a passage for the second drive output 12.

A device for closing the opening 13 may be provided to conceal the second drive output 12 when the work accessory 3 is not mounted in the housing 1.

In the variant embodiment illustrated in FIGS. 8 to 10, a sliding panel 23 is mounted in the housing 1. The panel 23 is movably mounted between an open position, shown in FIGS. 8 and 9, and a closed position, shown in FIG. 10. In the open position, the opening 13 is uncovered. The work accessory 3 can be placed in the housing 1. In the closed position, the opening 13 is covered by the panel 23. The work accessory 3 cannot be placed in the housing 1.

The structural piece 20 forms a slider 22 on which the panel 23 slides. The structural piece 20 extends into the rear strut 9. The panel 23 is thus arranged inside the housing 1. In the exemplary embodiment illustrated in the figures, the structural piece 20 is held between the two assembled outer half-shells 4; 5. FIG. 9 shows the structural piece 20 arranged in one of the outer half-shells 4. More particularly, the structural piece 20 is arranged between the rear end of the two outer half-shells 4, 5 and the electric motor 10.

The panel 23 may have an actuating member 26. Preferably, the actuating member 26 is protruding. Preferably, the actuating member 26 is adjacent to the opening 13 when the panel 23 is in the open position, as shown in FIG. 8. This provision enables the greater part of the panel 23 to be retracted into the housing 1. To this end, the two outer half-shells 4; 5 may each have an indentation 4'; 5', as shown in FIG. 6. These indentations 4', 5' are provided to accommodate one hand of the actuating member 26 when the panel 23 is in the open position.

As can be more clearly seen in FIG. 10, the slider 22 has guide ridges 24, and the panel 23 has guide notches 25. When the panel 23 is moved between the open and closed position, or inversely, the guide notches 25 slide on the guide ridges 24. The slider 22 may have protrusions 27, 28 forming hard nubs to hold the panel 23 in the open position, as can be seen in FIG. 8, or in the closed position, as can be seen in FIG. 10.

The housing 1 illustrated in FIGS. 8 to 10 can be used in the following manner with the work accessory 3 illustrated in FIGS. 1 to 3. The user lifts the panel 23 to uncover the opening 13. The user then inserts the connecting element 30 into the opening 13 by engaging the annular edge 38 of the connecting element 30 around the protrusion 15. The protrusion 15 thus guides the insertion of the work accessory 3. The annular edge 38 comes to a stop in the cavity 21. The protrusion 15 is covered by the annular wall 39. The user then rotates the work accessory 3 relative to the housing 1 to cause the internal fastening members 37 to engage with the retaining members 14.

In the exemplary embodiment illustrated in the figures, the internal fastening members 37 and the retaining members 14 are part of a bayonet-type locking device. As a variant, the internal fastening members 37 and the retaining members 14 could in particular be part of a screw-on locking device, if desired of the quarter-turn type.

To remove the work accessory 3, the user rotates the work accessory 3 in the opposite direction relative to the housing 1 to disengage the internal fastening members 37 from the retaining members 14. After removing the work accessory 3, the user can slide the panel 23 down to close the opening 13.

As a variant, the panel 23 provided to close the opening 13 is not necessarily arranged inside the housing 1. If desired, the panel 23 may be arranged outside the housing 1.

As a variant, the panel 23 provided to close the opening 13 is not necessarily slidably mounted on a structural piece 20 arranged inside the housing 1. If desired, the panel 23 may be slidably mounted on one or both of the outer half-shells 4, 5.

As a variant, the panel 23 provided to close the opening 13 is not necessarily slidably mounted. The panel 23 may be pivotally mounted on or in the housing 1.

As a variant, the opening 13 may be closed by a removably mounted plug. If desired, the plug may engage with the retaining members 14 and be mounted on the housing 1 in a similar manner to the work accessory 3.

As a variant, the housing 1 may have at least one and preferably two first drive output(s) 11 driven by the electric motor 10, with the first drive output(s) 11 each being configured to drive a removable rotary work tool 2.

As a variant, other types of rotary work tools 2 may be considered. The rotary work tools 2 are not necessarily whisks, but may in particular be kneading hooks.

As a variant, other types of work accessories 3 may be considered. The work accessory 3 is not necessarily a mixing stand, but may in particular be a ricer accessory, or an accessory for crushing ice cubes.

Of course, the invention is in no way limited to the embodiment described and illustrated and to its variants, which have only been provided by way of example. Changes can still be made, particularly with regard to the constitution of the various elements or by substituting technical equivalents, without departing from the scope of protection of the invention.

The invention claimed is:
1. A hand-held housing for a multi-purpose food preparation appliance, housing an electric motor, the housing comprising:
   at least one first drive output driven by the electric motor and configured to drive a removable rotary work tool, the housing having an opening exposed to a user in only a single direction and configured for mounting a removable work accessory, the housing comprising retaining members configured to engage with a connecting element of the work accessory mounted in the opening, the housing having a second drive output driven by the electric motor and configured to drive a rotary drive unit of the work accessory mounted in the opening, wherein the retaining members are arranged on an outer part of a protrusion arranged inside the housing around the second drive output and wherein each of the retaining members defines a length extending around a circumference of the protrusion so that the retaining members are configured to engage with an inner part of the connecting element of the work accessory mounted in the opening.

2. The hand-held housing for a multi-purpose food preparation appliance according to claim 1, wherein the protrusion has a frustoconical end.

3. The hand-held housing for a multi-purpose food preparation appliance according to claim 1, wherein the retaining members are supported by a structural piece arranged in the housing behind the opening.

4. The hand-held housing for a multi-purpose food preparation appliance according to claim 3, wherein the second drive output runs through the structural piece.

5. The hand-held housing for a multi-purpose food preparation appliance according to claim 2,
wherein the retaining members are supported by a structural piece arranged in the housing behind the opening, and
wherein the frustoconical end is formed by an annular cover mounted on the structural piece.

6. The hand-held housing for a multi-purpose food preparation appliance according to claim 3, wherein the structural piece forms a cavity opening into the opening, the retaining members being arranged in the cavity.

7. The hand-held housing for a multi-purpose food preparation appliance according claim 3, wherein the structural piece forms a slider on which slides a panel configured to occupy an open position in which the opening is uncovered and a closed position in which the opening is covered by the panel.

8. The hand-held housing for a multi-purpose food preparation appliance according to claim 7, wherein the slider has guide ridges, and the panel has guide notches sliding on the guide ridges when the panel is moved between the open and closed positions, or inversely.

9. The hand-held housing for a multi-purpose food preparation appliance according to claim 3, wherein the structural piece extends into a rear strut of the housing.

10. The hand-held housing for a multi-purpose food preparation appliance according to claim 9, wherein the housing has a handle extending from the rear strut.

11. The hand-held housing for a multi-purpose food preparation appliance according to claim 3, wherein the housing comprises two outer half-shells and wherein the structural piece is held between the two assembled outer half-shells.

12. The hand-held housing for a multi-purpose food preparation appliance according to claim 1, wherein the housing comprises two first drive outputs driven by the electric motor and each configured to drive a removable rotary work tool.

13. The hand-held housing for a multi-purpose food preparation appliance according to claim 1, wherein the opening is exposed to the user when no work accessory is mounted in the opening.

14. The hand-held housing for a multi-purpose food preparation appliance according to claim 1, wherein the housing defines an annular wall in the opening and the protrusion is disposed within the opening radially inward of the annular wall.

15. The hand-held housing for a multi-purpose food preparation appliance according to claim 1, wherein the first drive output is configured to be driven rotationally by the electric motor about a first axis and the second drive output is configured to be driven rotationally by the electric motor about a second axis, and wherein the first axis is nonparallel to the second axis.

16. The hand-held housing for a multi-purpose food preparation appliance according to claim 1, wherein each of the retaining members defines a width extending perpendicular to the length, and wherein the length of each retaining member is greater than the width.

17. The hand-held housing for a multi-purpose food preparation appliance according to claim 1, wherein the retaining members are spaced from the second drive output such that the second drive output is configured to rotate relative to the retaining members when the appliance is in use.

* * * * *